US012669068B2

(12) United States Patent
McCaffrey et al.

(10) Patent No.: US 12,669,068 B2
(45) Date of Patent: Jun. 30, 2026

(54) CYCLONIC SEPARATOR FOR SEAL SUPPORT

(71) Applicant: RTX Corporation, Farmington, CT (US)

(72) Inventors: Michael G. McCaffrey, Windsor, CT (US); Paul M. Lutjen, Kennebunkport, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/514,711

(22) Filed: Nov. 20, 2023

(65) Prior Publication Data

US 2025/0163827 A1 May 22, 2025

(51) Int. Cl.

*F01D 25/12* (2006.01)
*B04C 3/00* (2006.01)
*B04C 3/06* (2006.01)
*F01D 11/00* (2006.01)
*F01D 25/32* (2006.01)

(52) U.S. Cl.

CPC ................ *F01D 25/12* (2013.01); *B04C 3/00* (2013.01); *B04C 3/06* (2013.01); *F01D 11/005* (2013.01); *F01D 25/32* (2013.01); *F05D 2240/55* (2013.01); *F05D 2260/607* (2013.01)

(58) Field of Classification Search

CPC ........ F01D 25/12; F01D 11/005; F01D 25/32; F05D 2240/55; F05D 2260/607; B04C 3/00; B04C 3/06

See application file for complete search history.

(56) References Cited

U.S. PATENT DOCUMENTS

| | | | | |
|---|---|---|---|---|
| 3,673,771 | A | 7/1972 | Dickey | |
| 3,720,045 | A | 3/1973 | Murphy | |
| 8,240,121 | B2 | 8/2012 | Hazzard et al. | |
| 9,915,176 | B2 | 3/2018 | Murray et al. | |
| 10,450,951 | B2 * | 10/2019 | Rahaim | F02C 3/34 |
| 10,941,664 | B2 | 3/2021 | Osgood et al. | |
| 11,008,889 | B2 | 5/2021 | Ratzlaff et al. | |
| 11,053,814 | B2 | 7/2021 | Osgood et al. | |

(Continued)

FOREIGN PATENT DOCUMENTS

EP 3428411 A1 1/2019

OTHER PUBLICATIONS

Extended European Search Report dated Apr. 8, 2025, issued in corresponding application EP 24214316.2.

*Primary Examiner* — Nathaniel E Wiehe
*Assistant Examiner* — Theodore C Ribadeneyra
(74) *Attorney, Agent, or Firm* — Bachman & LaPointe, P.C.

(57) ABSTRACT

A separator system for a blade outer air seal cooling passage of a gas turbine engine includes a cooling passage defined between an engine casing on a radially outer boundary and alternating blade outer air seals and vanes on a radially inner boundary; and a support positioned along the cooling passage and dividing the cooling passage into an upstream portion and a downstream portion of the cooling passage; wherein the support further includes at least one cyclonic separator having a flow inlet opening to the upstream portion, and having a filtered air outlet feeding to the downstream portion, and a particulate outlet for particles separated from flow through the cyclonic separator.

18 Claims, 8 Drawing Sheets

(56) References Cited

U.S. PATENT DOCUMENTS

| | | | | |
|---|---|---|---|---|
| 2005/0129499 | A1* | 6/2005 | Morris | F01D 9/04 415/1 |
| 2009/0126337 | A1 | 5/2009 | Hazzard et al. | |
| 2015/0135727 | A1 | 5/2015 | Chillar et al. | |
| 2015/0252681 | A1* | 9/2015 | Kotian | F01D 25/26 415/108 |
| 2016/0186601 | A1* | 6/2016 | Manning | F04D 29/441 415/121.2 |
| 2017/0107852 | A1 | 4/2017 | Nasr et al. | |
| 2017/0335721 | A1* | 11/2017 | Spangler | F01D 25/32 |
| 2017/0335722 | A1 | 11/2017 | Candelori et al. | |
| 2018/0229167 | A1* | 8/2018 | Rambo | B01D 49/02 |
| 2019/0046999 | A9 | 2/2019 | Correia et al. | |
| 2019/0264616 | A1 | 8/2019 | Lovett | |
| 2020/0025041 | A1 | 1/2020 | Stevens et al. | |
| 2020/0300114 | A1 | 9/2020 | Osgood et al. | |
| 2020/0300116 | A1* | 9/2020 | Ratzlaff | F01D 25/246 |
| 2020/0300266 | A1* | 9/2020 | Osgood | F04D 29/582 |
| 2021/0215065 | A1 | 7/2021 | Ratzlaff et al. | |
| 2022/0099024 | A1 | 3/2022 | Osgood et al. | |

* cited by examiner

CYCLONIC SEPARATOR FOR SEAL SUPPORT

FIELD

The present disclosure relates to components in turbine engines and, more particularly, to a separator for high pressure coolant air fed to turbine components.

BACKGROUND

Gas turbine engines, such as those that power modern commercial and military aircraft and those that are used for land-based power generation, include a compressor section to pressurize a supply of air, a combustor section to burn a fuel in the presence of the pressurized air, and a turbine section to extract energy from the resultant combustion gases to generate thrust or electrical power.

Air exiting a high-pressure combustor of a gas turbine engine may carry debris, which often enters cooling passages for a blade outer air seal (BOAS). The presence of such debris may decrease cooling air provided to the BOAS, thereby reducing cooling effectiveness, which can lead to increased metal temperatures, and increasing a pressure ratio. A reduced cooling effectiveness and an increased pressure ratio may lead to premature oxidation, thermo-mechanical fatigue (TMF) failure, and creep.

SUMMARY OF THE DISCLOSURE

In one non-limiting configuration, the present disclosure relates to a separator system for a blade outer air seal cooling passage of a gas turbine engine, comprising a cooling passage defined between an engine casing on a radially outer boundary and alternating blade outer air seals and vanes on a radially inner boundary; and a support positioned along the cooling passage and dividing the cooling passage into an upstream portion and a downstream portion; wherein the support further comprises at least one cyclonic separator having a flow inlet opening to the upstream portion, and having a filtered air outlet feeding to the downstream portion, and a particulate outlet for particles separated from flow through the cyclonic separator.

In a non-limiting configuration, the particulate outlet is connected to an accumulation point within +/−10 degrees of a bottom dead center (BDC) of the engine casing.

In another non-limiting configuration, the system further comprises a water flush assembly communicated with the particulate outlet to flush particles to the accumulation point.

In still another non-limiting configuration, the system further comprises a valve for removal of particles when the gas turbine engine is not in normal operation.

In a further non-limiting configuration, the valve is located at the accumulation point.

In a still further non-limiting configuration, the cooling passage is defined circumferentially whereby separated particles can travel by gravity to the accumulation point.

In another non-limiting configuration, the support is a full hoop structure that extends around a circumference within the engine casing.

In still another non-limiting configuration, the full hoop structure is a compliant seal support.

In a further non-limiting configuration, the compliant seal support is positioned to support a radially outer compliant seal and a radially inner compliant seal, wherein the radially outer compliant seal and the radially inner compliant seal define a passage therebetween for air flow from the filtered air outlet.

In a still further non-limiting configuration, the at least one cyclonic separator comprises a plurality of cyclonic separators spaced around the circumference.

In another non-limiting configuration, the at least one cyclonic separator is integrally defined with the support.

In still another non-limiting configuration, the blade outer air seal comprises a plurality of blade outer air seals including a first upstream blade outer air seal, and the support is axially positioned downstream of the first upstream blade outer air seal.

In a further non-limiting configuration, the support is axially positioned upstream of a second blade outer air seal that is downstream of the first blade outer air seal.

In a still further non-limiting configuration, the system further comprises a plurality of vanes alternatingly positioned between rotors that seal against the plurality of blade outer air seals, and wherein the support is axially positioned downstream of the first upstream blade outer air seal and upstream of a first upstream vane.

In another non-limiting configuration, the filtered air outlet is connected to a vane cooling space defined between a vane outer flange and the engine casing.

In still another non-limiting configuration, the particulate outlet for particles is routed to a surface or an internal passage within the support.

In a further non-limiting configuration, the support defines a circumferential flow path for the particles, wherein the circumferential flow path leads to a valve for removal of particles when the gas turbine engine is not in normal operation.

In a still further non-limiting configuration, the circumferential flow path for the particles is defined within the support.

In another non-limiting configuration, the cyclonic separator comprises a cylindrical body having a conically tapered end, and further comprises a radially oriented inlet to the cylindrical body, a first axially oriented outlet from the cylindrical body, and a second axially oriented outlet from the conically tapered end.

In still another non-limiting configuration, the radially oriented inlet defines the flow inlet opening to the upstream portion, the first axially oriented outlet defines the filtered air outlet feeding to the downstream portion, and the second axially oriented outlet defines the particulate outlet for particles separated from flow through the cyclonic separator.

The foregoing features and elements may be combined in various combinations without exclusivity, unless expressly indicated otherwise. These features and elements, as well as the operation thereof, will become more apparent in light of the following description and the accompanying drawings. It should be appreciated that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

As stated previously, air exiting a high-pressure combustor of a gas turbine engine may carry debris, which often enters cooling passages of a blade outer air seal (BOAS). The presence of such debris may decrease cooling air provided to the BOAS, thereby reducing cooling effectiveness (resulting in increased metal temperatures) and increasing pressure ratio. A reduced cooling effectiveness and an increased pressure ratio may lead to premature oxidation, thermo-mechanical fatigue (TMF) failure, and creep.

Disclosed herein is a cyclonic separator system for separating debris such as particles or other particulate matter that may be entrained in the air exiting the combustor. The separator may be positioned in structures defining the cooling passages for interspersed BOAS and static vane structures. These cooling passages can be between an outer diameter of the BOAS or vane structures and an engine casing or turbine case. The cooling passages allow cooling air to pass through while the cyclonic separators separate debris particulates from the cooling air.

Figure 1:
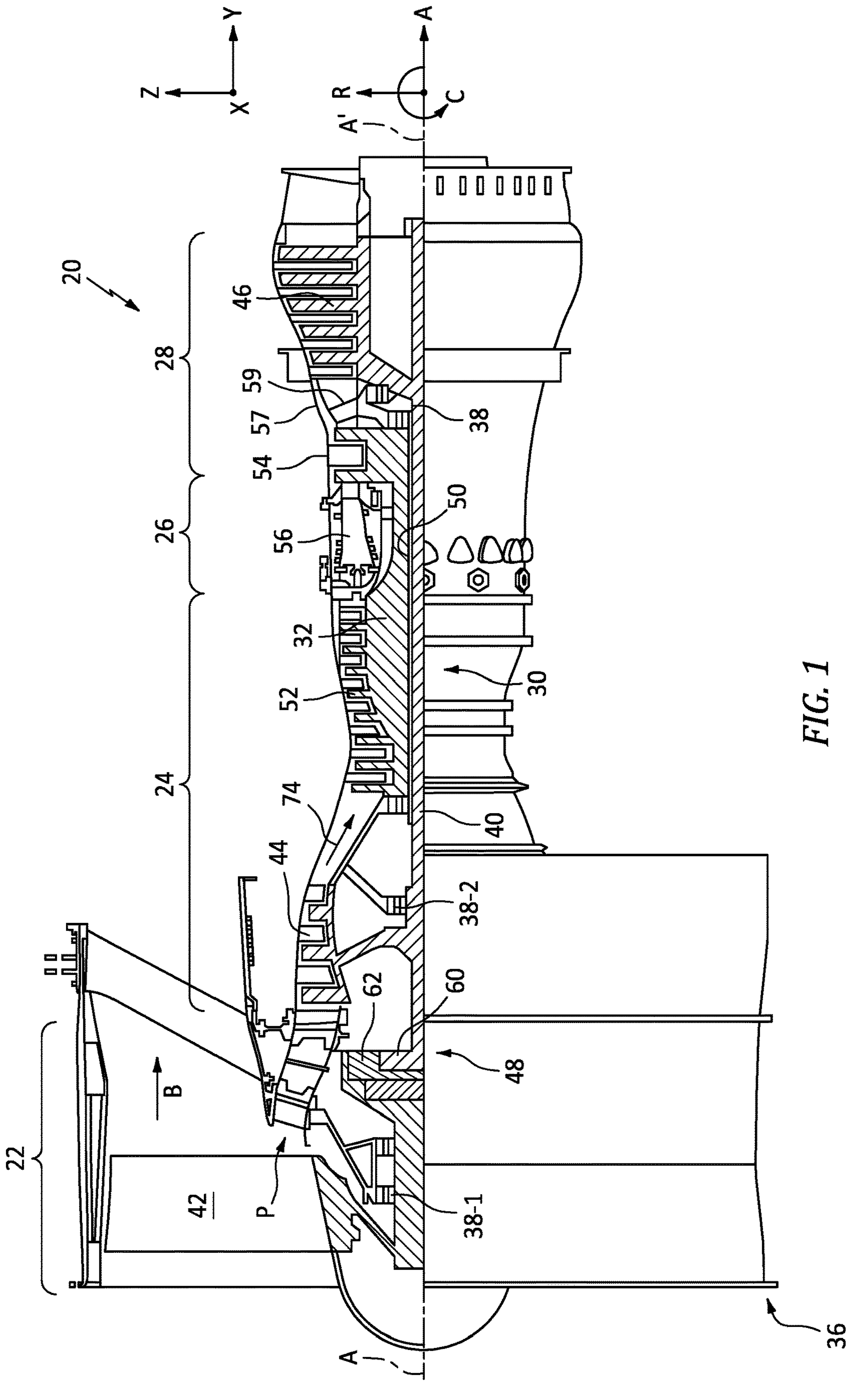
FIG. 1 illustrates a cross-sectional view of a gas-turbine engine, in accordance with various embodiments.

FIG. 1 is a cross sectional view, in an axial direction, of a gas turbine engine 20 which can be a setting for the cyclonic separator system as disclosed herein. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion, or to the direction associated with the inlet of the gas turbine engine. As utilized herein, radially inward refers to the negative R direction (towards axis A-A') and radially outward refers to the R direction (away from the A-A' axis). An A-R-C axis is shown in various drawings to illustrate the relative position of various components.

Gas turbine engine 20 may be a two-spool turbofan that generally incorporates a fan section 22, a compressor section 24, a combustor section 26, and a turbine section 28. In operation, fan section 22 may drive fluid, for example air, along a path of bypass airflow B while compressor section 24 may drive the fluid along a core flow path P for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines.

Gas turbine engine 20 may generally include a low-speed spool 30 and a high-speed spool 32 mounted for rotation about an engine central longitudinal axis A-A' relative to an engine static structure 36 or engine case via several bearing systems 38, 38-1, 38-2, etc. Engine central longitudinal axis A-A' is oriented in the y-direction on the provided X-Y-Z axes. It should be understood that various bearing systems 38 at various locations may alternatively or additionally be provided, including for example, bearing system 38, bearing system 38-1, bearing system 38-2, etc.

Low-speed spool 30 may generally include an inner shaft 40 that interconnects a fan 42, a low-pressure compressor 44, and a low-pressure turbine 46. Inner shaft 40 may be connected to fan 42 through a geared system 48 that may drive the fan 42 at a lower speed than low-speed spool 30. Geared system 48 may include a gear assembly enclosed within a gear housing. Geared system 48 couples the inner shaft 40 to a rotating fan structure. The geared architecture 48 can include a gear assembly 60 enclosed within a gear housing 62. The gear assembly 60 couples the inner shaft 40 to a rotating fan structure.

High-speed spool 32 may include an outer shaft 50 that interconnects a high-pressure compressor 52 and high-pressure turbine 54. A combustor section 56 may be located between high-pressure compressor 52 and high-pressure turbine 54. A mid-turbine frame 57 of engine static structure 36 may be located generally between high-pressure turbine 54 and low-pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low-pressure compressor 44 then high-pressure compressor 52, mixed and burned with fuel in the combustor section 56, then expanded over high-pressure turbine 54 and low-pressure turbine 46. The mid-turbine frame 57 includes airfoils 59 which are in the core airflow path C. Turbines 46, 54 rotationally drive the respective low-speed spool 30 and high-speed spool 32 in response to the expansion. It will be appreciated that each of the positions of the fan section 22, compressor section 24, combustor section 26, turbine section 28, and geared system 48 may be varied. In various embodiments, geared system 48 may be located aft of combustor section 26 or even aft of turbine section 28, and fan section 22 may be positioned forward or aft of the location of geared system 48.

Figure 2:
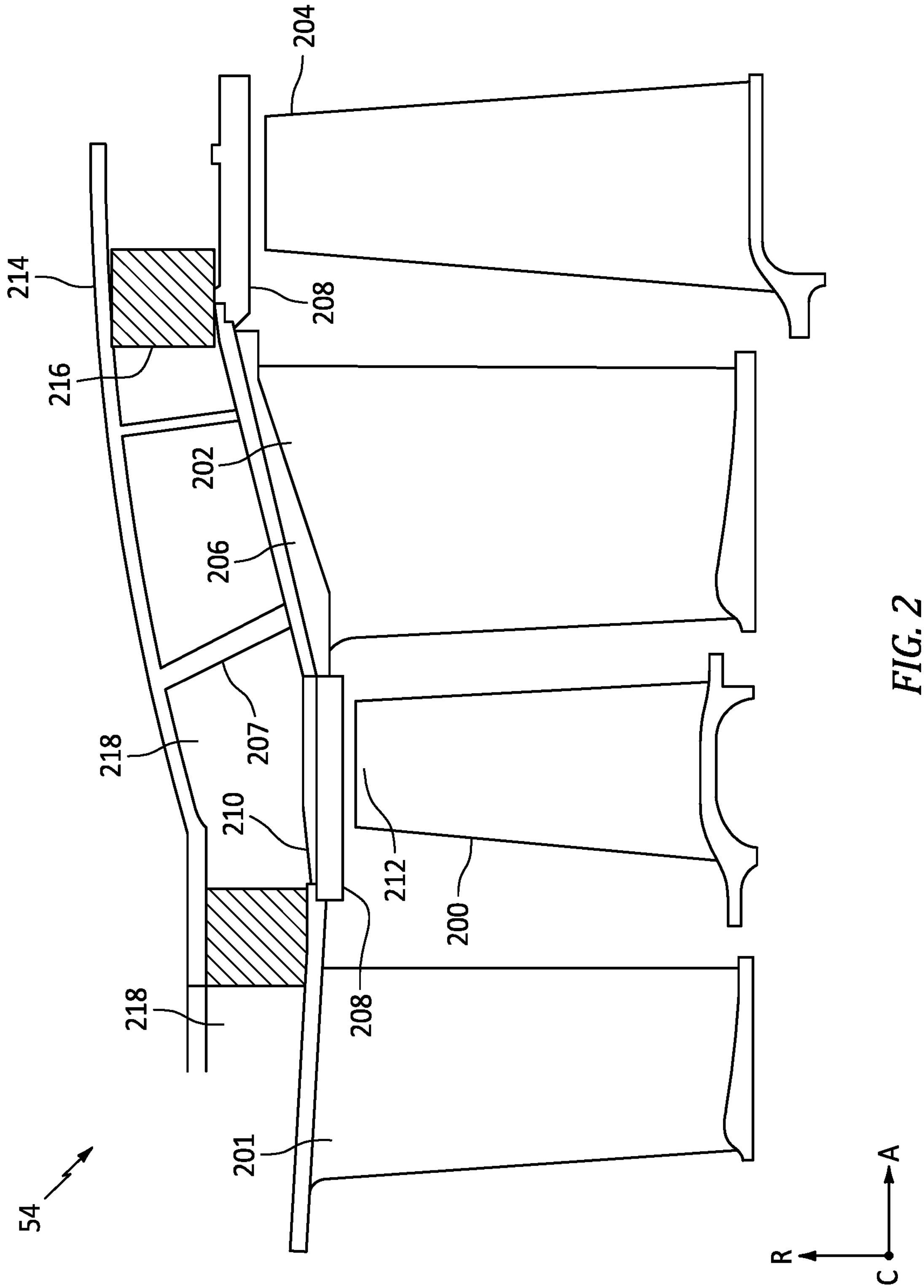
FIG. 2 is an enlarged schematic cross-section of a portion of a high-pressure turbine section of the gas turbine engine of FIG. 1, in accordance with various embodiments.

With reference now to FIGS. 1 and 2, a portion of the high-pressure turbine 54 includes a first vane 201, a first rotor blade 200, a second vane 202, and a second rotor blade 204. The first rotor blade 200 and the second rotor blade 204 are each configured to rotate about the axis A-A' (FIG. 1) relative to first vane 201 and second vane 202 in response to receiving a flow of fluid from the combustor section 26. It will be appreciated that flow in the illustration of FIG. 2 will be from left to right in the drawing, flowing generally from vane 201 to blade 200, to vane 202 and then to blade 204. Thus, kinetic energy from the flow is converted to mechanical energy, or torque, by the first rotor blade 200 and the second rotor blade 204. The second vane 202 is coupled to a frame 214 of the high-pressure turbine 54 and conditions the flow of air between the first rotor blade 200 and the second rotor blade 204. The second vane 202 thus acts as a stator and does not rotate relative to the axis A-A'.

A blade outer air seal (BOAS) 208 is located radially outward from the first rotor blade 200. The high-pressure turbine 54 may include multiple BOAS 208 positioned radially outward of a plurality of rotor blades, and FIG. 2 shows another BOAS 208 positioned radially outward of blade 204. BOAS 208 can typically extend circumferentially and surrounding the longitudinal axis A-A' of FIG. 1. The BOAS 208 is designed to function as a seal to reduce axial air leakage between a tips of blades such as tip 212 of the first rotor blade 200, and the frame 214. In particular, the BOAS 208 has an inner surface that forms a seal along with the tip 212 of the first rotor blade 200. In that regard, the core airflow C of FIG. 1 may contact the inner surface of the BOAS 208.

A shroud block 210 (which may also be referred to as a support 210) may be positioned radially outward from the BOAS 208 and may couple the BOAS 208 to the frame 214. The shroud block 210 may resist movement of the BOAS 208 relative to the frame 214. Stated differently, the shroud block 210 may retain the BOAS 208 in place relative to the frame 214. As shown in FIG. 2, BOAS 208 that is aligned with the second blade 204 is not in this configuration supported by a shroud block or support 210, but may be supported by any other mechanical structure as desired or appropriate.

As mentioned above, the rotor blades 200, 204, the first vane 201, the second vane 202, and the BOAS 208 may be exposed to the core airflow C of FIG. 1. The core airflow may be relatively hot, and thus it may be desirable for the rotor blades 200, 204, the first vane 201, the second vane 202, and the BOAS 208 to be relatively heat resistant. In this regard, each of these components may be coated with a ceramic material to increase their respective heat resistance. In this regard, the ceramic coating insulates the component part from abrupt changes in temperature. In various embodiments, if the component has a thick portion of metal adjacent to a thin portion of metal and the back side of the component is cooled using cooling fluid, then the thicker portion of the component may retain heat longer than the thinner portion, which may create a thermal stress between the tick and the thin. Accordingly, in various embodiments, the ceramic coating may smooth the thermal transition between the two sections reducing stress and dilutes and evens out the temperature of the metallic part. In various embodiments, oxidization may be prevented by the metallic coatings of aluminum or cobalt oxides, which may prevent the infiltration of oxygen into the metallic substrate. Although the present disclosure discusses ceramic coated parts of the high-pressure turbine 54, one skilled in the art will realize that any ceramic coated part of the gas turbine engine 20 of FIG. 1 is covered within the scope of the disclosure.

Still referring to FIG. 2, a cooling flow path or passage 218 for carrying a cooling flow past BOAS 208, vane flanges 206 and other outer diameter components of the turbine assembly is shown defined between frame 214 as an outer diameter wall and shroud block 210 and/or BOAS 208 and vane flange 206 alternatingly positioned as in inner diameter wall. Frame 214 and vane flange 206 can be radially connected by radial support structures 207 as shown. The resulting cooling flow path is shown at 218.

Air fed to the cooling flow path 218 typically can come from the compressor and, as mentioned above, can contain particulates and other matter that can foul cooling holes and surfaces of the cooling passage and interfere with the intended cooling.

Separators 216 can be positioned along cooling flow path 218 to remove dirt or other particulate matter from the flow of cooling air entering cooling flow path 218.

Figure 3B:
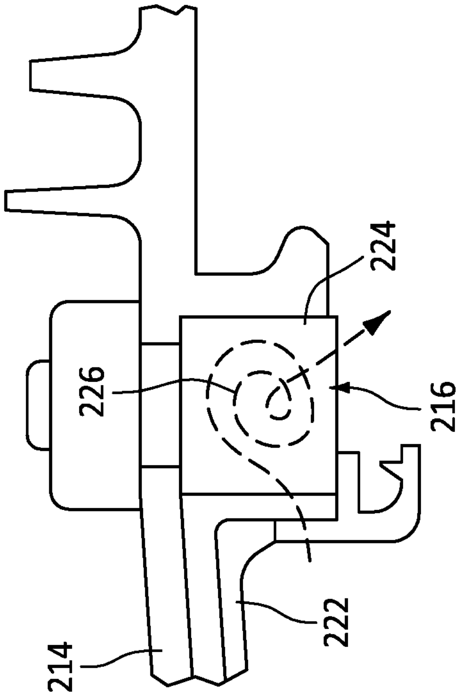
FIGS. 3*a* and 3*b* a further schematically illustrate the position downstream of the W-seal support illustrated in FIG. 4.
Figure 3A:
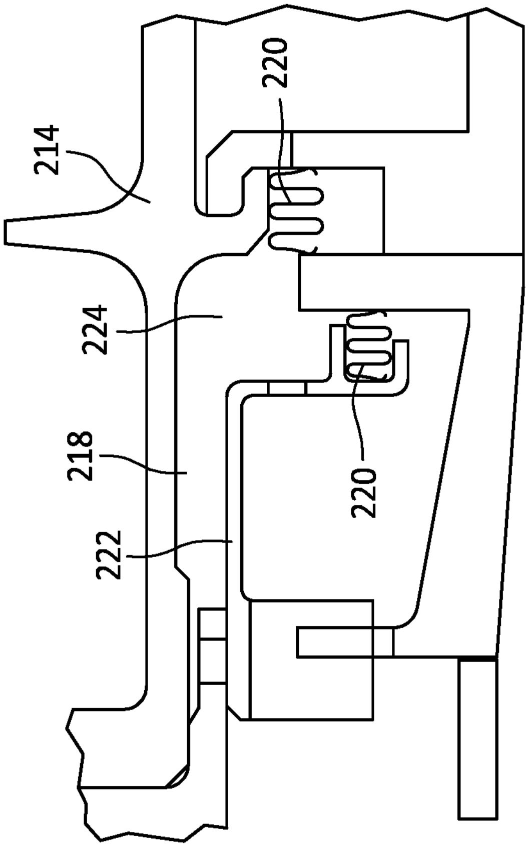

FIG. 3*a* illustrates an enlarged portion of interest along the cooling flow path 218. As shown, in this location, several compliant seals, for example high-temperature, compliant seals 220 can be positioned to ensure seal between axially adjacent components. A high-temperature, compliant seal is a type of seal that can conform to irregular surfaces and operate at temperatures well above the useful limits for elastomeric seals. The seal can be a metallic bellows type of seal such as a "W" or "M" seal, a ceramic rope seal, with or without a metallic sheath, a torsional metallic spring seal, such as a "dogbone" or "diamond" seal, or a segmented "finger seal", or any combinations of these seal types. Without intending any limitation, the drawings schematically illustrate this seal as a W-seal.

Compliant seals 220 are supported by a support 222, which can have walls arranged and configured to support the seals as desired. Typically there are flow passages through support 222 to allow cooling flow as intended. FIG. 3*b* further illustrates a space 224 along the cooling flow passage 218, in this case between compliant seal support 222 and frame 214, in which a separator 216 can be positioned to separate particulates and other matter from the flow of cooling air through the cooling passage 218. In this regard, and considering FIGS. 4 and 5, further detail of separator 216 are provided. It should be noted that support 222 can be any typically full hoop or at least substantially full hoop structure that typically extends around a circumference within the frame or housing to support various structures. For example, in some instances this may be a support for vanes, or any other structure in the same general location. Thus, structure 222 can be any generally circumferential or hoop structure including but not limited to any of these vane or compliant seal supports.

Figure 4:
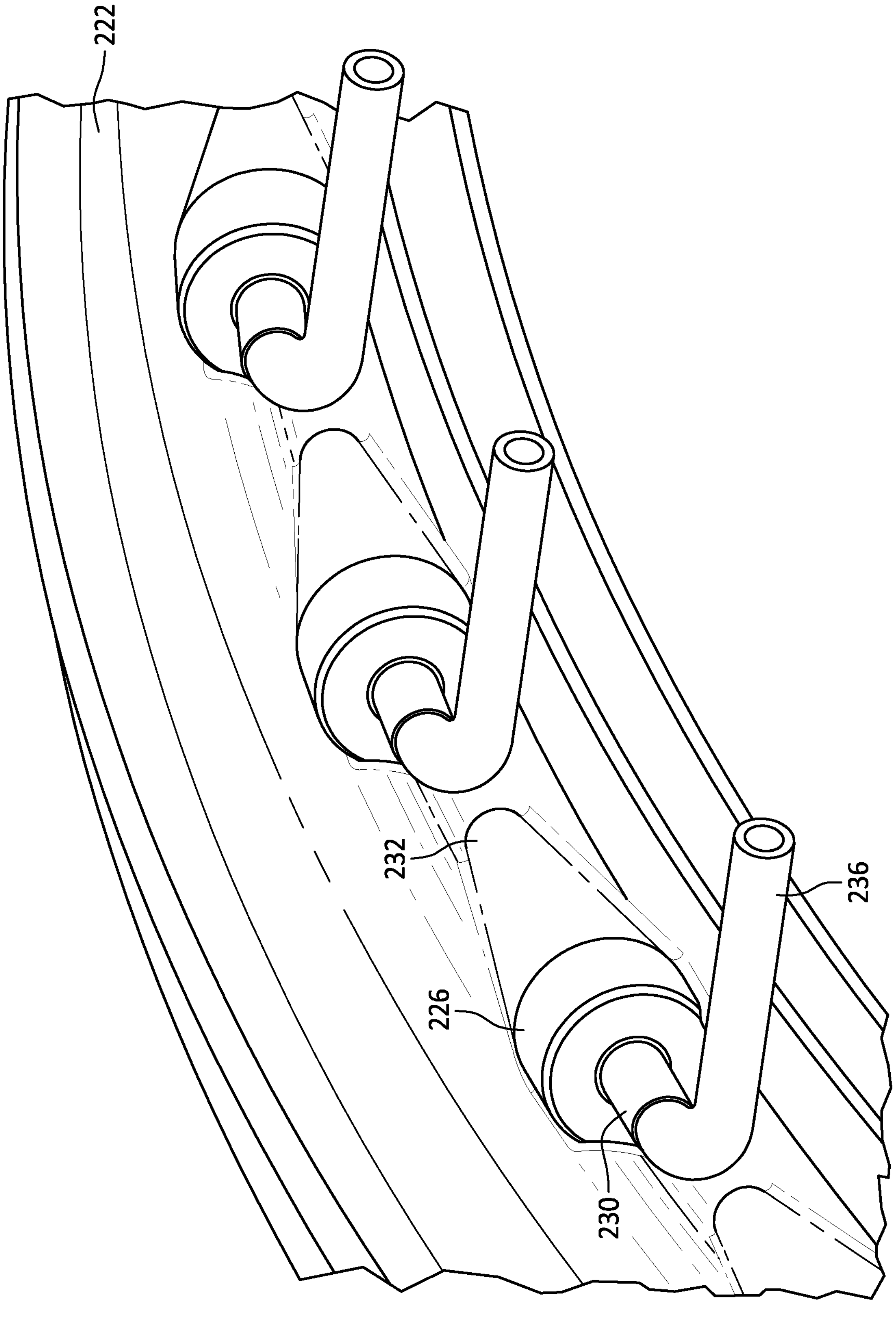
FIG. 4 is an upstream perspective view of a W-seal support having a plurality of cyclonic separators.
Figure 5:
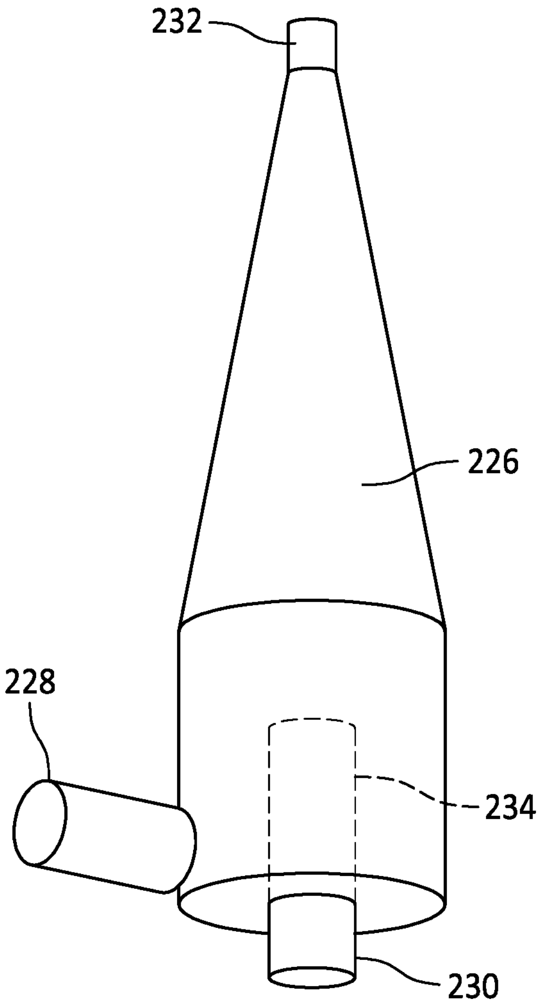
FIG. 5 illustrates a typical cyclonic separator.

FIG. 4 shows a segment of a bulkhead, in this case a W-seal support 222, specifically a downstream surface of support 222, wherein downstream is taken with respect to air flowing through the cooling space. FIG. 5 shows a cyclonic separator 226 which can be positioned within space 224 to accept a flow of high pressure dirty air, for example from the compressor, and to separate this flow into a clean portion and a portion containing separated dirt or other particulate matter. As would be understood by a person skilled in the art, cyclonic separator 226 has an inlet 228 and two outlets 230, 232. Inlet 228 can be oriented as a radial inlet, that is, entering separator 226 directed along a radius or parallel to a radius of the separator. In this case, the inlet is offset from the radius to impart a swirling flow into the separator. Separator 226 can be oriented with inlet 228 facing upstream to the high-pressure side of support 222 to receive the flow of cooling fluid, in this case air, to be treated.

Flow enters a cylindrical body portion of separator 226 and flows in a circular pattern. The air flows to vortex finder 234 and exits outlet 230, while the particulate is separated be secondary flow through conically tapered portion of separator 226 toward particulate outlet 232. Air leaving outlet 230 can be substantially dirt and particle free air circles into vortex finder 234 leading to outlet 230 for the clean air flow, while particles are driven to outlet 232 where they are routed to a suitable location for removal as will be discussed below.

Referring back to FIG. 4, a plurality of separators 226 are shown arranged around a circumference of W-seal support 222. Separators 226 are disposed in support 222 with inlet 228 (not visible in FIG. 4) extending through support 222 to open into the high-pressure flow upstream of W-seal support 222 and thereby receive the flow of dirty air. Outlet 230 is shown feeding to a flow pipe 236 which receives flow from outlet 230 and is angled to face downstream for delivering cleaned cooling air to the next zone. In the meantime, particle outlet 232 is shown and can be connected to a collection and removal system as will be discussed further below.

It should be noted that separators 226 can be separately installed into W-seal support 222, or alternatively could be manufactured into support 222, for example through additive manufacturing. Such a manufacturing technique results in a structure wherein separators 226 are integrally incorporated into W-seal support 222. In the illustration of FIG. 4, the outer surfaces of separators 226 are shown blended into the surrounding support 222 to represent integral construction, again for example using additive manufacturing.

At typical pressure differences across W-seal support 222, air flow can be readily driven through cyclonic separators to result in sub 3 μm filtration and a pressure drop of only about 2.5 psid. Further, if separators are positioned between the upstream most vane 201 and upstream most rotor blade 200 (FIG. 2), then separation can be effected here and avoided at the later stages of vanes and blades/BOAS. Thus, with a single circumferential array of cyclonic separators, cooling air can be fed to 1st and later vane and rotor/BOAS stages without further filtering and with significantly reduced likelihood of blocking or interfering with cooling function.

Figure 6:
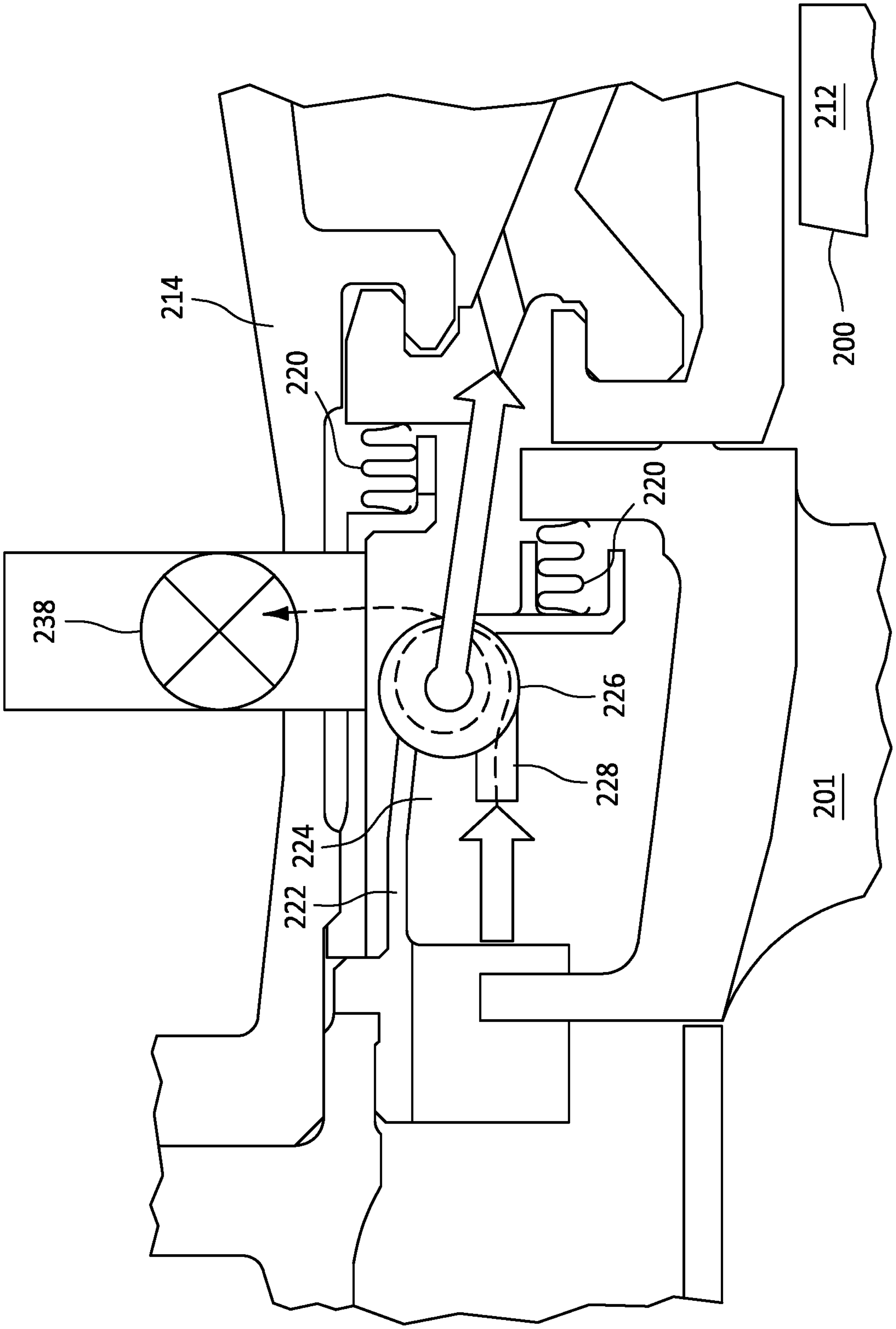
FIG. 6 schematically illustrates flow through a cyclonic separator to a dump/drain valve for particulate matter.

FIG. 6 further illustrates another embodiment with a separator 226 configured within support 222, which can be representative of a plurality of separators 226 positioned circumferentially around support 222. Separators 226 can be positioned at support 222, in this case W-seal support 222, and in this configuration the particles leaving outlets 232 are fed to a particle collection system leading to a dump drain valve schematically illustrated at 238. Dump drain valve 238 can be positioned at or substantially near, for example within +/−10 degrees of, a bottom dead center (BDC) of the overall system, be it the engine casing, or an internal particulate conveyance system. In this regard, for simplicity dump drain/valve 238 is shown at an upper portion of the drawing, but in non-limiting configurations valve 238 would actually be at the gravitational bottom of the structure (illustrated also in FIG. 8 discussed below). In addition, it should be noted that more than one accumulation point can be positioned at or near bottom dead center. In one non-limiting configuration, one point could be located at each of +5 and −5 degrees from bottom dead center.

Flow from outlet 232 can be configured, for example with configuration of the structure of separator 226, to direct particulate matter as desired. Further, this particulate matter is directed to dump drain valve 238 such that, during downtime of the overall assembly or engine, particulate matter can be removed. In one configuration, flow to the dump drain may be carried out at a relatively low flow rate while the engine is operating, for example to minimize losses. During idle and shutdown, flow to the dump drain may be substantially increased, for example with additional fluid, for example liquid (e.g., water), flow, thus forcing any accumulation to purge more completely, without substantial operating inefficiency. This condition may also occur during start up, or during specific maintenance test runs, including water-wash cleanings.

Figure 7:
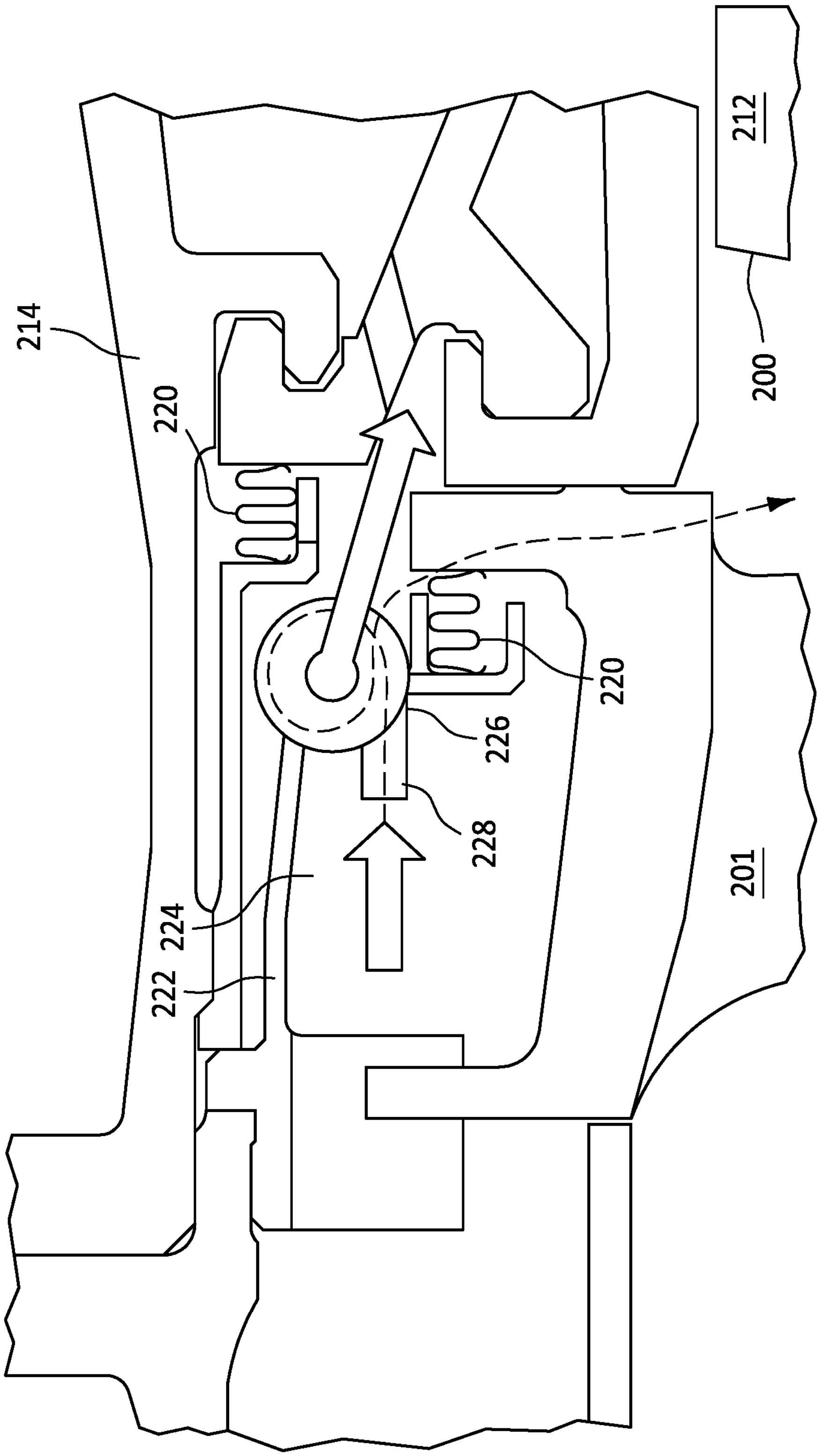
FIG. 7 schematically illustrates another flow of particulate matter separated by cyclonic separators.

FIG. 7 illustrates another embodiment wherein separated particles leaving outlet 232 are guided radially inwardly toward the W-seal, feather seals, and intersegment gaps. Additionally, dedicated passages can be formed to pass the particles directly back into the cooling flow path. While not ideal, the particles entering the flow path will mix with the primary airflow and be diluted. The hot surfaces of the flow path can be made tolerant of the possible particle melting and adhesion and subsequent spallation and or removal via cleaning cycles. This is in contrast to particles inside the cooled surfaces which are typically very difficult to remove once they are deposited on the inside surfaces.

Figure 8:
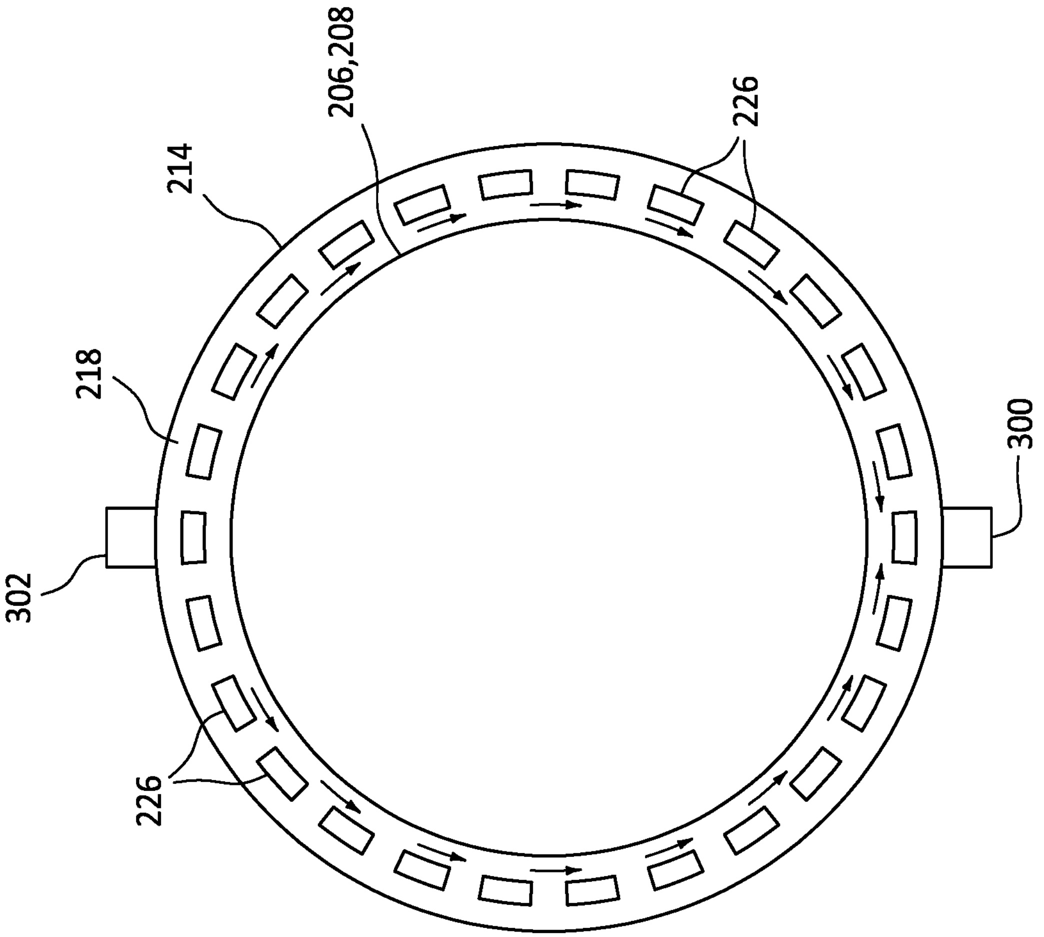
FIG. 8 is a schematic sectional illustration showing a non-limiting configuration of particulate flow from the cyclonic separators.

Turning now to FIG. 8, a schematic cross section further illustrates a non-limiting configuration of particulate flow following separation of the particles in cyclonic separators. FIG. 8 shows frame 214 defining a radially outer boundary of the cooling flow path 218, and alternating BOAS 208 and vane flange 206 structures defining an inner boundary of the cooling flow path 218. A plurality of cyclonic separators 226 are schematically illustrated positioned around the circumference of cooling flow path 218. From these separators 226, particulate exits into path 218 and either generally stays in place or can travel by gravity to a bottom dead center area indicated by 300. In this regard, arrows are shown in FIG. 8 indicating that flow of particulate will in all cases be downwards. This is not to be considered limiting, especially in the case where all separators may be circumferentially oriented in the same direction such that particulates tend to swirl around the circumference of cooling path 218. An accumulation point such as valve 238 discussed above can be located approximately at bottom dead center 300 such that particles collected there can be removed at an appropriate time, for example when the gas turbine engine is not operating. In addition, a water circulation system schematically illustrated at 302 can be configured to supply a flow of water or other fluid, for example when the gas turbine engine is not operating, in order to flush particles in the cooling path 218 to bottom dead center 300. FIG. 8 shows the particle flow as generally between frame 214 and alternating BOAS 208 and vane flanges 206. In one configuration, particulate is released into this area and flows as described. It is also possible to configure support 222 such that it has an internal passage into which particles can be released, and then travel to a bottom dead center 300 for capture and removal, for example via a valve.

In some instances the accumulation area for example at dump drain/valve 238 can become filled with particles. When this occurs, it may be desirable to provide for a portion of particulate matter to be re-introduced back into the cooling passage where it is diluted by flow through the cooling passage. This recycling of the particulate may in some instances be preferable to overflowing of dump drain 238.

Typically, during operation of the gas turbine engine, the percent of cooling flow is 50%-75% of the total local flow needed to support both cooling and cumulative leakages. Thus the clean exit of the separators may be sized to flow 50%-75% of the total air mass flow, and the remaining 50%-25% of air mass flow would have the majority of dirt particles. Thus, separators 226 and flow configuration surrounding them can be set such that between 50 and 75% of the total air mass flow flows through the clean air exits of the separators, and between 25 and 50% of the total air mass flow flows through the particulate or dirty air outlets.

It should be noted that since the cyclonic separators as disclosed herein will be exposed to cooling air that itself is still relatively high in temperature, as well as high temperature conditions from further inward, the separators, like other structures in this portion of the engine, should comprise materials which are stable under expected conditions.

The foregoing description is exemplary of the subject matter of the subject matter disclosed herein. Various non-limiting embodiments are disclosed, however, one of ordinary skill in the art would recognize that various modifications and variations in light of the above teachings will fall within the scope of the appended claims. It is therefore to be appreciated that within the scope of the appended claims, the disclosure may be practiced other than as specifically described. Thus, the scope of the present claims is not specifically limited by the details of specific embodiment disclosed herein, but rather the claims define the full and reasonable scope of the disclosure.

We claim:

1. A separator system for a blade outer air seal cooling passage of a gas turbine engine, comprising:
- a cooling passage defined between an engine casing on a radially outer boundary and alternating blade outer air seals and vanes on a radially inner boundary; and
- a support positioned along the cooling passage and dividing the cooling passage into an upstream portion and a downstream portion;
- wherein the support further comprises at least one cyclonic separator having a flow inlet opening to the upstream portion, and having a filtered air outlet feeding to the downstream portion, and a particulate outlet for particles separated from flow through the cyclonic separator, wherein the blade outer air seals comprises a plurality of blade outer air seals including a first upstream blade outer air seal, and wherein the support is axially positioned upstream of the first upstream blade outer air seal, and wherein the vanes comprise a plurality of vanes alternatingly positioned between rotors that seal against the plurality of blade outer air seals, and wherein the support is axially positioned downstream of a first vane of the plurality of vanes and upstream of a second vane of the plurality of vanes.

2. The system of claim 1, wherein the particulate outlet is connected to an accumulation point positioned within +/−10 degrees of a bottom dead center (BDC) of the engine casing.

3. The system of claim 2, further comprising a water flush assembly communicated with the particulate outlet to flush particles to the accumulation point.

4. The system of claim 2, further comprising a valve for removal of particles when the gas turbine engine is not in normal operation.

5. The system of claim 4, wherein the valve is located at the accumulation point.

6. The system of claim 2, wherein the cooling passage is defined circumferentially whereby separated particles can travel by gravity to the accumulation point.

7. The system of claim 1, wherein the support is a full hoop structure that extends around a circumference within the engine casing.

8. The system of claim 7, wherein the full hoop structure is a compliant seal support.

9. The system of claim 8, wherein the compliant seal support is positioned to support a radially outer compliant seal and a radially inner compliant seal, wherein the radially outer compliant seal and the radially inner compliant seal define a passage therebetween for air flow from the filtered air outlet.

10. The system of claim 7, wherein the at least one cyclonic separator comprises a plurality of cyclonic separators spaced around the circumference.

11. The system of claim 1, wherein the at least one cyclonic separator is integrally defined with the support.

12. The system of claim 1, wherein the particulate outlet for particles is routed to a surface or an internal passage within the support.

13. The system of claim 12, wherein the support defines a circumferential flow path for the particles, wherein the circumferential flow path leads to a valve for removal of particles when the gas turbine engine is not in normal operation.

14. The system of claim 13, wherein the circumferential flow path for the particles is defined within the support.

15. The system of claim 1, wherein the cyclonic separator comprises a cylindrical body having a conically tapered end, and further comprises a radially oriented inlet to the cylindrical body, a first axially oriented outlet from the cylindrical body, and a second axially oriented outlet from the conically tapered end.

16. The system of claim 15, wherein the radially oriented inlet defines the flow inlet opening to the upstream portion, the first axially oriented outlet defines the filtered air outlet feeding to the downstream portion, and the second axially oriented outlet defines the particulate outlet for particles separated from flow through the cyclonic separator.

17. A separator system for a blade outer air seal cooling passage of a gas turbine engine, comprising:
- a cooling passage defined between an engine casing on a radially outer boundary and alternating blade outer air seals and vanes on a radially inner boundary; and
- a support positioned along the cooling passage and dividing the cooling passage into an upstream portion and a downstream portion;
- wherein the support further comprises at least one cyclonic separator having a flow inlet opening to the upstream portion, and having a filtered air outlet feeding to the downstream portion, and a particulate outlet for particles separated from flow through the cyclonic separator, wherein the blade outer air seals comprises a plurality of blade outer air seals including a first upstream blade outer air seal, and wherein the support is axially positioned upstream of the first upstream blade outer air seal wherein the filtered air outlet is connected to a vane cooling space defined between a vane outer flange and the engine casing.

18. The system of claim 17, further comprising a plurality of vanes alternatingly positioned between rotors that seal against the plurality of blade outer air seals, and wherein the support is axially positioned downstream of a first upstream vane of the plurality of vanes.

* * * * *